Patented June 30, 1953

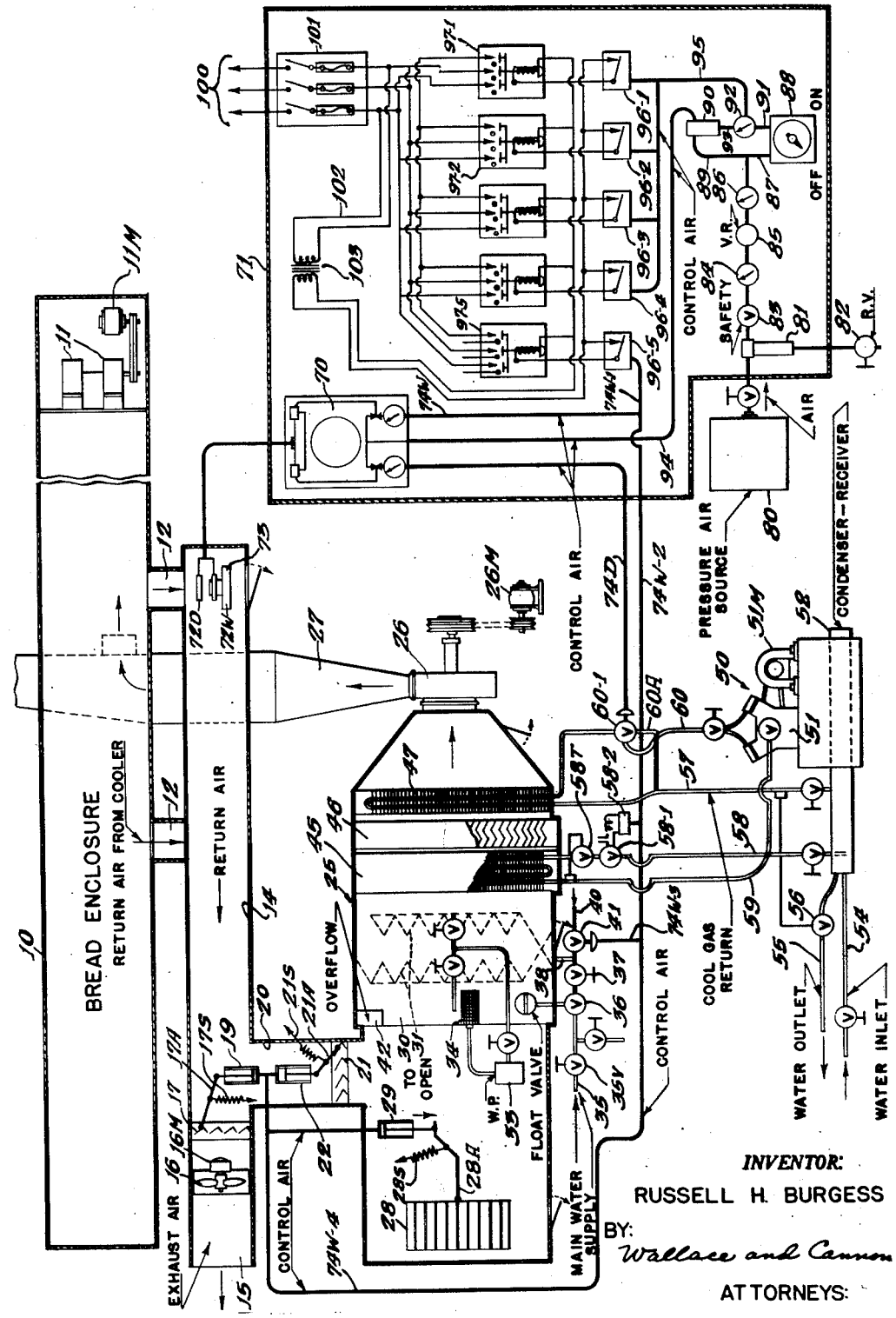

2,643,523

UNITED STATES PATENT OFFICE 2,643,523

BREAD COOLING AND CONDITIONING SYSTEM

Russell H. Burgess, Chicago, Ill., assignor to Drying Systems, Inc., Chicago, Ill., a corporation of Illinois Application June 22, 1950, Serial No. 169,651

2 Claims. (Cl. 62—3)

This invention relates to bread cooling and conditioning apparatus adapted particularly for use in commercial bakeries, where the production rate is relatively high, approximately 100 loaves per minute, and the bread must be properly conditioned and cooled to 90 to 95 degrees Fahrenheit for succeeding operations of slicing or wrapping, or both, within a predetermined time limit.

The baked bread leaves a conventional, conveyorized oven at quite a high temperature. The internal temperature of the loaf is approximately 205 degrees Fahrenheit and the surface temperature is in excess of 300° F.

In the large bakeries, this hot bread is transferred mechanically directly to the bread cooler, where it must be cooled to an average internal temperature of 90° F. within a predetermined time schedule.

The fact that bread is quite hygroscopic in nature, it is greatly affected during its cooling stage by the condition of the air to which it is exposed during this cooling stage. If this air is too dry, the bread loses too much weight during cooling and the result is an underweight loaf that may cause the baker to be in violation of laws pertaining to minimum weights, in addition to the unfavorable hard, dry texture of the loaf. If the air is too humid the loaf becomes soggy or too soft, so that trouble is encountered at the slicing and wrapping machines, in addition to its loss in appearance because of its inability to hold proper shape. Furthermore, if the air is too cold, the loaf surface will shrivel and wrinkle causing the loaf to lack in appearance and sales potential.

There is another point of major importance that must be considered in cooling hot bread. The temperature, as well as the moisture content, of the air to which the hot bread is exposed during cooling, must be held within close limits if the appearance and condition of the cooled loaf is to be satisfactory. Likewise, the temperature of the shelf or tray with which the bread comes in contact during its cooling stage, must be warmed up and held within limited temperatures before the bread comes into contact with the shelf or tray. If hot, freshly baked bread is allowed to come into contact with a cold surface (below 90° F.) such as a cooler rack or tray for a period of 45 minutes or longer, the bread will have a tendency to stick to the tray or rack. This is because the moisture within the hot loaf is conducted to the point of contact between the loaf and shelf, or tray, by reason of the lower temperature of the shelf or tray. When the loaf sticks to the shelf or tray of a conveyorized bread cooler, it causes serious trouble because the bread will not disengage itself from the tray at the automatic unloading station of the cooler.

It has been found, from experience, that when cooler trays are heated to the desired final bread temperature, usually 90° F., prior to the loading of the trays with hot bread, then no trouble will be encountered from bread sticking to the trays. After the trays are once loaded with hot bread, the tray will not drop in temperature until the bread has reached the approximate temperature of the tray during the cooling process.

As soon as hot bread starts to enter the cooler, the sensible heat content of the supply air to the cooler must be gradually reduced so that when the cooler is fully loaded with hot bread, the conditioned air supplied to the cooler must be cool air approximately 95% saturated. By cool air, 95% saturated, I mean approximately 70° F. dry bulb and 68° F. wet bulb.

To sum up, the normal cycle of my air conditioning process, let us start at the beginning of a production run:

First, the conveyorized cooler trays must be warmed up to 90° F. to receive the bread, and the cooler enclosure and trays must be dry. Therefore, the conditioning unit must supply air at approximately 115° F., dry bulb, and 80° F., wet bulb, to properly condition the cooler to receive the bread.

Secondly, as hot bread is fed to the cooler, the supply air temperature to the cooler must be gradually reduced until the cooler is completely loaded with bread, which takes from one to one and a half hours. When the cooler becomes loaded with bread, the supply air must be maintained at approximately 70° F. dry bulb, and 68° F. wet bulb, until the flow of hot bread to the cooler is stopped.

Third, when the flow of hot bread to the cooler is stopped, the cooler necessarily becomes gradually "unloaded." It is then necessary to gradually increase the dry bulb temperature only of the supply air temperature to the cooler, so that when the cooler has become devoid of bread the air temperature and humidity of the supply air has reached the same level as when the cooler was conditioned to receive hot bread at the beginning of the production schedule. The cooler is then ready for another production run.

During the performance cycle of my air conditioning system, the dampers and fans work in combination as follows:

During the first step, the mixing dampers automatically position themselves so that all air supplied to the cooler enclosure is returned to the washer and dehumidifying or cooling coil before it passes thru the reheat coil and then to the supply fan. During this period the exhaust fan is off and fresh air intake damper is closed.

As the second step progresses, the mixing dampers gradually position themselves so that more and more outside air is introduced to the conditioning unit and likewise more and more air is exhausted from the cooler enclosure to the outside, and less and less air is returned from the cooler enclosure to the conditioning unit.

Furthermore, as the exhaust air dampers start to open the exhaust fan is automatically started and the flow of heating medium to the reheat coil is gradually reduced. As this control process progresses it gradually reaches the stage where the air conditioning system is handling 100% outside air, and the entire volume of outside air is drawn thru the air washer, cooling coil and reheat coil. Usually the reheat coil is not functioning at this stage. When 100% outside air is being handled by the conditioning unit, the air is 100% exhausted from the cooler enclosure and no air is returned from the cooler enclosure to the conditioning unit.

From this explanation it can be seen that quite a wide range of both dry bulb temperature and wet bulb temperature of the supply air is required during different stages of the cooling process of the bread. Even tho an adequate control system is provided, to properly sense the condition of the air leaving the bread cooler, it is necessary that this control system be properly connected to mechanical devices and other components of an air conditioning system required to perform various functions necessary to properly condition air before it enters the cooler. It is, accordingly, an important object of the present invention to simplify the attainment of proper cooling and conditioning of bread, and a related object is to enable the cooling to be accomplished at a relatively rapid rate while at the same time enabling the moisture content or condition of the bread to be governed within relatively close limits.

Another object of this air conditioning system is to properly condition the cooler enclosure and the conveyor trays within the cooler enclosure prior to the loading of bread to this cooler and likewise to the cooler trays.

Another object of this invention is to provide an automatic control system that will function in such a manner as to automatically vary the conditions of the supply air temperature to the cooler enclosure in response to the rate at which the hot bread is introduced into the cooler. Another object of this invention is to take advantage of the evaporative cooling during certain stages of the cooling process and during that season of the year when the outside wet bulb temperatures do not exceed 75° F. This can only be done if an air washer, or other air saturating means, is used.

Another object of this invention is to provide clean air to the cooler enclosure at all times without use of mechanical air filter. This is done, of course, by the air washer which is a part of this system.

Another object of this invention is to provide a simple control system for the combination of all the devices that go to make up the air conditioning system and to make possible the starting and stopping of all motors, and the positioning of all automatic damper motors, in proper sequence from one dial switch. With this method it is only necessary to turn a simple manual dial switch to the automatic position in order that all motors start in proper order, not simultaneously, but consecutively, and the thermostatic sensing elements can automatically take over control of the mixing dampers.

Likewise, it is only necessary to turn this manual dial switch to the "off" position in order that all motors stop consecutively in proper sequence and the outside air intake damper and the exhaust air damper move to a "closed" position so that no outside air can be taken in thru these openings when the system is not in operation.

Other and further objects of the present invention will be apparent from the following description and claims and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

The single figure of the drawing illustrates in a schematic manner a bread cooling and conditioning system embodying the features of the invention.

For purposes of disclosure, the invention is illustrated in the drawing as embodied in a bread cooling system that is associated with a bread cooling enclosure 10 through which the bread is moved at a selected or predetermined rate by conventional means such as a conveyor. This enclosure 10 is arranged to have air circulated therein through the action of a pair of booster fans 11 that are driven from a drive motor 11M. The air that is thus circulated is withdrawn at one or more points from the enclosure 10 through return ducts 12 that lead into a main return duct 14, and this return duct forms a part of an air treating or conditioning system which, under the present invention, is effective to control the temperature as well as the humidity of such air. Thus, the return air duct 14 terminates at its left-hand end as viewed in the drawing in an exhaust opening 15, and an exhaust fan 16 having a drive motor 16M is mounted in this exhaust end 15 for discharging a proportion of the air from the return duct 14 when this is desired. Such exhaust of air from the duct 14 is governed by an exhaust air damper 17 that has an operating arm 17A. This arm 17A has a spring 17S acting thereon that is effective normally to urge the exhaust damper 17 to its closed position. When the damper 17 is to be opened, this may be accomplished by an air operated piston and cylinder device 19 that shifts the arm 17A in an upward or damper-opening direction when air is applied to the motor 19.

The return air from the duct 14 is normally directed through a transverse duct 20 that is located ahead of the damper 17, and this duct 20 has a blocking or return air damper 21 therein which has an operating arm 21A that is acted upon by a spring 21S so as to be urged normally to its open position. An air operated piston and cylinder device 22 has its piston connected to the arm 21A so that when air is applied to the piston cylinder device 22, closing movement will be imparted to the return air damper 21.

The air that passes through the return duct 20 is fed into a washing, cooling and reheating unit 25, and is normally drawn through this unit to the right by a blower 26 that is located at the right-hand end of the unit 25 and which has a drive motor 26M so as to be effective to drive the air through a duct 27 through which the conditioned air is fed back or discharged into the bread enclosure 10.

The unit 25, near its left-hand end, and to the left of the transverse return duct 20, is provided with a fresh air inlet opening that is governed by a damper 28 which has an operating arm 28A associated therewith whereby the damper 28 may be opened and closed. The arm 28A has a spring 28S acting thereon which tends to close the damper 28, and when the damper is to be opened, this may be accomplished by an air operated piston and cylinder device 29, the piston of which is connected to the arm 28A so that when air is supplied to the piston and cylinder device 29, the fresh air damper 28 will be opened.

The air treating unit 25 is herein illustrated in plan section and on the bottom thereof a tank 30 is afforded in which a supply of water is afforded for spray-washing of the air passing through the unit 25. Such supply of water is fed through sprays 31 in the left-hand portion of the unit 25 by means including a motor driven pump 33, such pump withdrawing the water from the tank 30 through a strainer 34. Water may be supplied to the tank 30 from a supply pipe 35 and through a manual valve 35V, this water being then passed through an automatic float controlled valve 36, another hand valve 37, and a branch pipe 38 into the tank 30. Water may also be supplied if desired from a chilled water supply pipe 40 that is connected through a normally closed, air-pressure opened valve 41 to the branch pipe 38. It is desirable to provide for continuous overflow of water from the tank 30, and for this purpose an overflow opening 42 is provided, and the float valve 36 is so adjusted that a continuous overflow is attained.

To the right of the washing sprays 31, a cooling radiator 45 is mounted within the unit 25, and to the right of the cooling radiator a baffle unit 46 is provided for eliminating entrained water from the air. Further to the right and within the unit 25, a heating radiator 47 is mounted so that within the unit 25 the air may be washed by the action of the sprays 31, may be cooled by the action of the cooling radiator 45 and may be reheated by the action of the heating radiator 47, as will be described in some detail hereinafter.

The refrigerant for the cooling coil 45 is supplied from a refrigerating unit 50 which embodies a compressor 51 and a drive motor 51M, and this refrigerating unit 50 includes a combined condenser-receiver 52 that is cooled by water fed from a supply pipe 54. An outlet pipe 55 from the condenser-receiver 52 includes an automatic thermostatically controlled valve 56 that has the thermostatic element thereof associated with a cool gas return line 57 that leads to the condenser 52, as will hereinafter be described.

The liquid refrigerant from the condenser-receiver 52 is supplied to the cooling radiator 45 through a liquid supply line 58 that is connected to one end of the coil of the radiator 45 through a first valve 58-1, which is normally closed and solenoid opened, and through an automatic expansion valve 58T, this expansion valve 58T being automatically controlled by having its thermostatic element associated with a return line 59 which is connected to the other end of the coil of the radiator 45 and which extends to the suction side of the compressor 51.

Under and in accordance with the present invention, the air that has been washed and cooled in the unit 25 may be reheated by the heating radiator 47 through the use of the hot gas from the compressor 51, and for this purpose, a hot gas line 60 is extended from the output of the compressor through a three-way valve 60-1 normally closed to the heating radiator 47, and normally open to the line 57 through a line 60A, and thence to one end of the coil of the heating radiator 47, the other end of this coil of the radiator 47 being connected to the cool gas return line 57.

The dampers 17, 21 and 28, the chilled water control valve 41, the cooling radiator control valve 58-1, and the reheating radiator control valve 60-1 are all controlled under the present invention in accordance with and in response to the sensed condition of the return air in the return duct 14, and this control is accomplished by means that are pneumatic in character. Thus, a pneumatic control unit 70 of conventional construction is provided in the main control cabinet 71, and this pneumatic control element has a dry bulb temperature sensing element 72D and a wet bulb temperature sensing element 72W mounted in the return air duct 14 so as to be subjected to the action of the return air that is withdrawn from the enclosure 10. The wet bulb sensing element 72W has a water supply tank 73 associated therewith in the conventional manner. The dry bulb temperature sensing element 72D is arranged to control the pressure of control air supplied to a control pipe 74D that is operatively connected to the power unit of the hot gas valve 60-1, and the arrangement is such that when the dry bulb temperature of the air in the return duct 14 becomes objectionably low, an increase of air pressure is effected in the line 74D, so as to open or impart further opening movement to the air operated valve 60-1, thereby to feed additional hot gas from the compressor 51 to the reheating radiator 47.

Similarly, the pneumatic control mechanism 70 is arranged in response to the action of the wet bulb sensing element 72W to vary the air pressure supplied to a control line 74W. The arrangement is such that when the relative humidity of the air in the duct 14 becomes objectionably high, the air pressure in the control line 74W is increased, and the controlling action that results will be described hereinafter.

The pressure air for the automatic control unit 70 is supplied from a pressure air source 80, and this air is passed through a filter 81 having a manual control blow-off valve 82, and thence through a safety valve 83 and a gauge 84 to a reducing valve 85. From the reducing valve the air is fed through another gauge 86 and through a pipe 87 to an adjustable air valve 88, and through a branch line 89 to an accumulator 90 that is arranged to release at about 10 pounds pressure. From the adjustable air valve 88, the air is led through a pipe 91 to a gauge 92 and thence through a pipe 93 to the lower end of the accumulator 90. The accumulator 90 is connected by a pipe 94 to the automatic control unit 70 so as to thereby afford a source of control air at an appropriate pressure for such unit.

Air pressure taken from the line 91 at the gauge 92 by a pipe 95 is utilized to control a series of normally opened, air pressure closed switches 96-1, 96-2, 96-3 and 96-4, branch lines being afforded from the line 96 to the several switches. These switches form a part of an electrical control panel which also includes a similar air operated switch 96-5. The air operated switches 96-1 to 96-5 are arranged to govern a plurality of contactors 97-1 to 97-5 which are utilized for controlling operation of various electrically powered elements of the system. Thus, a three-phase electrical power source 100 is connected through the usual manual switch 101 to the input sides or terminals of the several contactors 97-1 to 97-5, and a two-phase connection 102 is provided through a step-down transformer 103 to one terminal of each of the operating coils of the aforesaid contactors. The other terminal of the operating coil of each of the contactors is connected to one terminal of the related pressure switch 96, the other terminal of each such switch being connected to the other side of the two-phase power source. Thus, when any one of the pressure switches 96-1 to 96-5 is closed, the corresponding contactor 97 will be actuated to its closed position.

The contactor 97-1 is arranged, through connections not shown herein, to control the operating motor 26M of the blower 26; the contactor 97-2 is arranged to control the booster fan motor 11M; the contactor 97-3 is arranged to govern the operation of the spray supply pump 33; the contactor 97-4 is arranged to govern operation of the compressor motor 51M; while the contactor 97-5 is arranged to control operation of the exhaust fan motor 16M.

The switches 96-1 to 96-4 are arranged so that they will be closed in predetermined sequence as the air pressure is increased in the line 95, and preferably these switches are adjusted so as to close in the order just named. The switch 96-5 is arranged to be closed upon increase of air pressure in the control line 74W, and for this purpose a branch line 74W-1 is extended from the line 74W to the switch 96-5.

The energizing circuit for the control valve 58-1 of the cooling radiator 45 is arranged to be governed by an air operated switch 58-2 which is connected to a further extension 74W-2 of the control line 74W. Similarly, the valve 41 in the chilled water inlet line is connected by a branch line 74W-3 to the control line 74W so as to be opened upon predetermined increase of pressure in this control line.

A further extension 74W-4 of the aforesaid control line is extended to the air operated piston and cylinder devices 19, 21 and 29 so that these piston and cylinder devices are operated in unison upon predetermined increase in pressure in the control line 74W. This operation is such that the exhaust air damper 17 is opened, the return air damper 31 is closed, and the fresh air damper 28 is opened upon such predetermined increase in pressure in the control line 74W.

With the structure that has thus been described, the present system operates not only with great efficiency, but also within relatively close limits of control so that the output of the bread cooling and conditioning system will invariably meet the exacting requirements of modern baking practice. The efficiency of operation is, of course, increased through the utilization of the hot gas output of the compressor as a source for reheating the air in the treating or conditioning unit 25, and thus the refrigerating unit 50 serves a double purpose in the present instance. The accuracy of control of the condition of the output of the system is, of course, made possible in a large sense by the continuous adjustment of the system in accordance with the condition of the return air, this condition, of course, being a direct measure of the condition of the bread as it is being passed through the treating and conditioning enclosure 10.

It will be evident in view of the foregoing that the present invention enables bread cooling and conditioning to be accomplished quite rapidly while at the same time insuring that the output of the system will have the desired temperature condition within relatively small limits.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a bread cooling and conditioning system, a bread enclosure in which freshly baked hot bread is adapted to be positioned for a predetermined period, an air conditioning system including a return duct through which air may be withdrawn from said enclosure, a treating unit to which such air may be fed from said return duct, and a discharge duct from said unit including a blower and arranged to discharge treated air back into said enclosure, air washing means in said unit, a cooling radiator and a heating radiator in said unit, means including valved supply lines for supplying cooling and heating media to said cooling and heating radiators respectively, a normally open blocking damper in said return duct for blocking air flow from said return duct to said unit, an exhaust duct from said return duct between said bread enclosure and said blocking damper and including a normally closed exhaust damper and an exhaust fan, a fresh air inlet between said blocking damper and said unit and including a normally closed fresh air damper, sensing means disposed in said return duct for sensing the condition of the air withdrawn from said enclosure, control means operably associated with said sensing means, and power operated devices governed by said control means and effective to adjust said dampers, start and stop said exhaust fan, and control said valved lines in accordance with the sensed condition of the air withdrawn from said enclosure.

2. In a bread cooling and conditioning system, a bread enclosure in which freshly baked hot bread is adapted to be positioned for a predetermined period, an air conditioning system including a return duct through which air may be withdrawn from said enclosure, a treating unit to which such air may be fed from said return duct, and a discharge duct from said unit including a blower and arranged to discharge treated air back into said enclosure, air washing means in said unit, a cooling radiator and a heating radiator in said unit, a refrigerating system including a compressor, a condenser and a receiver, a hot gas line extended from the output side of said compressor to the inlet of said heating radiator and a cool gas return line from the outlet of said heating radiator to said condenser, a control valve in said hot gas line, a liquid supply line from said receiver to the inlet of said cooling radiator and a suction line from the outlet of said cooling radiator to the intake of said compressor, a control valve in said liquid supply line, a normally open blocking damper in said return duct for blocking air flow from said return duct to said unit, an exhaust duct from said return duct between said bread enclosure and said blocking damper and including a normally closed exhaust damper and an exhaust fan, a fresh air inlet between said blocking damper and said unit and including a normally closed fresh air damper, sensing means disposed in said return duct for sensing the condition of the air withdrawn from said enclosure, control means operably associated with said sensing means, and power operated devices governed by said control means and effective to adjust said dampers, start and stop said exhaust fan, and open and close said valves in accordance with the sensed condition of the air withdrawn from enclosure.

RUSSELL H. BURGESS.

References Cited in the file of this patent

UNITED STATES PATENTS

| Number | Name | Date |
|---|---|---|
| 1,583,060 | Lewis | May 4, 1926 |
| 1,837,798 | Shipley | Dec. 22, 1931 |
| 1,846,875 | Karr | Feb. 23, 1932 |
| 2,101,651 | Reece | Dec. 7, 1937 |
| 2,130,092 | Kettering | Sept. 13, 1938 |
| 2,172,877 | Parcaro | Sept. 12, 1939 |
| 2,177,602 | Spaan | Oct. 24, 1939 |
| 2,196,011 | Gibson | Apr. 2, 1940 |
| 2,236,191 | Wolfert | Mar. 25, 1941 |
| 2,257,487 | Tenney | Sept. 30, 1941 |
| 2,264,221 | Smith | Nov. 25, 1941 |
| 2,343,467 | McGrath | Mar. 7, 1944 |
| 2,419,119 | Christensen | Apr. 15, 1947 |
| 2,515,842 | Swinburne | July 18, 1950 |